United States Patent [19]

Houle et al.

[11] 4,270,130
[45] May 26, 1981

[54] THERMAL DEFORMATION RECORD DEVICE WITH BLEACHABLE DYE

[75] Inventors: Conrad G. Houle, Webster; Dennis G. Howe, Fairport; Harold T. Thomas; Joseph J. Wrobel, both of Rochester, all of N.Y.; Bruce G. Fike, deceased, late of Rochester, N.Y., by Joyce A. Fike, executrix

[73] Assignee: Eastman Kodak Company, Rochester, N.Y.

[21] Appl. No.: 1,519

[22] Filed: Jan. 8, 1979

[51] Int. Cl.³ .................... G01D 15/02; G01D 15/34
[52] U.S. Cl. ................................ 346/77 E; 346/1.1; 346/135.1
[58] Field of Search .................. 346/1, 77 E, 135; 96/46 HD, 84 R; 358/129; 365/126; 430/50

[56] References Cited

U.S. PATENT DOCUMENTS

| | | | |
|---|---|---|---|
| 3,169,061 | 2/1965 | Hudson | 430/50 |
| 3,269,839 | 8/1966 | Altman | 96/75 |
| 3,745,009 | 7/1973 | Jenkins et al. | 96/84 R |
| 3,769,019 | 10/1973 | Wiese, Jr. et al. | 96/84 R |
| 3,787,873 | 1/1974 | Sato et al. | 346/76 L |
| 4,081,278 | 3/1978 | Dedinas et al. | 96/48 HD |
| 4,088,497 | 5/1978 | Brown et al. | 96/48 HD X |
| 4,097,895 | 6/1978 | Spong | 346/135 X |

*Primary Examiner*—George H. Miller, Jr.
*Attorney, Agent, or Firm*—Donald W. Strickland

[57] ABSTRACT

In accordance with the present invention, the optical characteristics of a thermal deformation record device are so altered that the device can be read back using the same beam as was used for recording. Moreover, the read beam can be used for playback at an arbitrarily high power level to enhance the signal-to-noise ratio of the recovered signal and yet not damage the deformation recording.

32 Claims, 2 Drawing Figures

THERMAL DEFORMATION RECORD DEVICE WITH BLEACHABLE DYE

BACKGROUND OF THE INVENTION

1. Field of the Invention

The present invention relates to a record device of the thermal deformation type and, more particularly, to such a device that has improved optical properties.

2. Description Relative to the Prior Art

It is well known to record information in the form of deformations, or ripples, in a thermoplastic film by forming a charge pattern on the film surface corresponding to the information to be recorded, and then heating the thermoplastic film to its melting point. Electrostatic forces produce a deformation pattern in the fluid thermoplastic film corresponding to the charge pattern, the pattern being rendered stable by cooling the thermoplastic film below its melting point. Recently, it has been found that a highly concentrated laser beam can be used to directly form a deformation pattern in a thermoplastic recording material without the use of an electrical charge pattern. For example, U.S. Pat. No. 3,475,760 discloses the direct recording of pictorial information, such as pictures or printed matter, at reduced size on a recording material. In accordance with that disclosure, a scanning laser beam is amplitude-modulated as a function of the pictorial information to be recorded. The recording material is a thermoplastic material that includes a dye strongly absorbant to radiation at the wavelength of the laser beam. As the modulated laser beam scans across the thermoplastic recording material, the material is selectively melted and some of the material is displaced from the exposed area so as to form ridges along the edges of the area. Since the thermoplastic material quickly cools as the laser beam moves to other areas of the material, the deformation pattern is frozen into the recording material. The recorded image can be viewed by well known Schlieren optical techniques.

Even more recently, it has been discovered that thermal deformation recording is suitable for recording information at a high packing density (such as encountered, for example, in video and data processing applications) if the thermal recording material is properly selected. U.S. patent application Ser. No. 862,069, filed Dec. 19, 1977, in the names of H. T. Thomas and J. H. Wrobel, the entire disclosure of which is hereby incorporated herein by reference, discloses several dye-binder combinations useful as recording materials for the high quality, thermal deformation recording of such information. According to that disclosure, a scanning laser beam is pulsed on and off in accordance with the information to be recorded and is used to thermally deform a recording material. The resulting deformations are crater-like in configuration and are generally on the order of one micron in length. Upon illumination, the information is readable through playback optics.

The illumination for playing back a thermal deformation recording of the type disclosed in U.S. Pat. No. 3,475,760 or U.S. patent application Ser. No. 862,069 (such recording hereinafter referred to as "direct thermal recording") can be provided in one of two ways:

(1) The recording laser beam can be used to read the recorded information by reducing its power to a level such that the recording material is not re-melted during the reading process.

(2) A second laser beam having a wavelength at which the recording material is transparent can be used at a relatively high power level for playback, there being no danger of re-melting the recording material since it does not significantly absorb that laser radiation.

Each of these methods has its drawbacks. Reading with the recording laser at a reduced power level results in a playback signal having a lower signal-to-noise ratio (SNR), especially if certain precautions are not taken in designing the readout system (such as using a relatively expensive photodetector suitable for low light detection). For many applications, such as home use, the cost of a high quality, low light detector can be prohibitive. On the other hand, reading the recorded information with a high power laser beam having a wavelength at which the recording material is transparent is not without its own problems, i.e., such a technique requires separate laser systems for recording and playback.

SUMMARY OF THE INVENTION

The present invention provides a thermal deformation record device having improved optical properties that enable a third technique to be used for playing back a direct thermal recording. If one follows the teaching of the present invention, the recorded deformation pattern can be read using a laser beam of any desired wavelength, including the wavelength of the recording laser beam. As a result, only one laser system is required for both recording and playback. But, unlike known methods of readout, the reading beam can have any selected power level and yet not re-melt the thermal recording—even though the same laser is used for playback as was used for recording.

In one aspect, the present invention relates to a record device comprised of a support having coated thereon a thermal recording material that contains information recorded in the form of a deformation pattern. In a first state, the thermal recording material is absorbant to radiation of a selected wavelength for recording of a deformation pattern by exposure to radiation. In accordance with the present invention, the thermal recording material is altered to a second state that is relatively transparent to the exposing radiation. For example, in the case where the recording material is comprised of a binder and a dye that, in its unaltered state, is absorbant to recording radiation, the dye can be altered to a second state relatively transparent to the recording radiation by any of a number of processes that include bleaching (chemical, thermal or photo) photochromic dye action, indicator dye action and washing, depending upon the dye type.

In another aspect of the present invention, a method of playing back information recorded in the form of deformations in a thermal recording material is disclosed. In a first condition, the recording material is absorbant to radiation of a selected wavelength for recording the deformations by exposure to a laser beam. The recording material is alterable to a second condition in which it is relatively transparent to the recording radiation. To play back such a record device, the thermal recording material is altered from its first condition to its second condition to render it relatively transparent to the recording radiation. The recorded deformation pattern is then illuminated with radiation from the recording laser to develop a signal indicative of the recorded information. Since the thermal recording material has been rendered relatively transparent to the wavelength(s) of radiation used for playback, the power level of the illuminating radiation can be increased to maximize, or at least enhance, the signal-to-noise ratio of the recovered signal.

These and other aspects of the invention are fully described below.

DETAILED DESCRIPTION OF THE PREFERRED EMBODIMENTS

Figure 1:
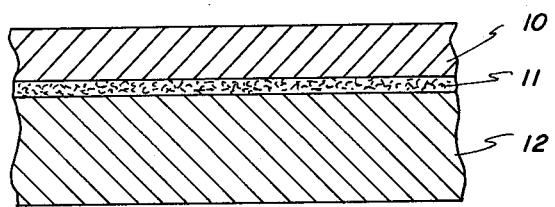
FIG. 1 shows in cross section a thermal recording element before recording.

FIG. 1 shows a typical thermal recording element comprised of a thermal recording material 10 coated on a support 12. The support 12 may be transparent or not, depending upon the method of playback, and can be formed, for example, of glass, metal, ESTAR (polyethylene terephthalate), and other known materials. A reflective layer 11 of a metal such as aluminum is provided so that the element can be read back by reflection, as is well known in the art. If the element is to be read by transmission, the reflective layer 11 would be omitted and support 12 would be transparent. The thickness of the recording material 10 depends, in general, on the type of information to be recorded. For example, U.S. patent application Ser. No. 862,069 (filed Dec. 19, 1977) teaches that the recording material should be less than one micron in thickness for high quality, high information density recording such as video recording. For the type of pictorial recording disclosed in U.S. Pat. No. 3,475,760 a layer thickness less than about ten microns is stated as being preferred. For other applications, the thickness of the recording material 10 may be greater or less. The recording material 10 includes a dye that is strongly absorbant in the wavelength range of the recording beam, so that energy from the recording beam can be transformed into heat in the recording material 10 to produce proper thermal deformation. Specifically, the heat build-up causes the temperature of the recording material 10 to rise above its glass transition temperature ($T_g$) and melt. Upon cooling of the recording material 10 below its $T_g$, the deformation pattern becomes "frozen" in the recording material. The recording material 10 should have a glass transition temperature significantly higher than the ambient temperature, but lower than the temperature imparted to a point on the material by the recording beam. Otherwise, the recording material 10 will not retain the thermal deformation pattern after recording, or cannot be recorded on at all.

Figure 2:
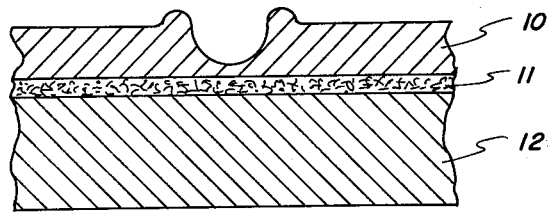
FIG. 2 shows in cross-section a thermal recording element after recording.

FIG. 2 illustrates in cross section a crater-like deformation in the recording material 10 produced by directly melting the recording material 10 with a pulse of laser radiation, as disclosed in U.S. patent application Ser. No. 862,069, filed Dec. 19, 1977. According to that disclosure, by encoding an analog signal, such as a video signal, to a digital signal, and by using the digital signal to modulate a laser beam, a track of the crater-like deformations is produced as the laser beam scans the recording material. It is believed that the crater structure provides a high degree of radiation scattering of the read beam, thereby modulating the read beam with the recorded information upon playback. Any density variations that exist due to the varying thickness of the crater structure are not believed to be important for purposes of playing back the recorded information, except insofar as such density variations affect the complex index of refraction, and thus the scattering properties, of the recording material. This is why a read beam having a wavelength at which the recording material 10 is transparent can be used for playback. It will be apparent to those of ordinary skill in the art that the crater structure shown in FIG. 2 is only one type of deformation structure and that the present invention is not limited thereto. In general, the type of deformation pattern provided will depend upon the particular type of recording material used, the type of information recorded and its encoding scheme.

As previously stated, a high powered reading beam can produce an increased SNR in those applications wherein a relatively inexpensive photodetector is used. For example, assuming blue light for playback illumination, an inexpensive silicon photodiode (as opposed to a photomultiplier) produces a playback signal whose SNR increases for higher power levels of the blue read beam. Further, for many types of photodetectors, the SNR of the played back signal is maximized when the detection process is shot noise limited. It is therefore desirable to increase the read beam power to obtain this condition. In order to avoid re-melting the recording material when using a high powered reading beam, a partial solution is to read with radiation of a wavelength at which the recording material is relatively transparent. For example, a thermal recording material comprised of a 3-to-1 mixture by weight of Iosol Red dye (available from Allied Chemical Corp.) and a cellulose nitrate binder absorbs strongly in the 488 nm wavelength range (the wavelength range of an argon laser), but is substantially transparent (apart from surface reflections and some minor absorbance) in the 633 nm wavelength range (the wavelength range of a helium-neon laser). This particular recording material, therefore, can be recorded using an argon laser and read using a helium-neon laser operated at a high enough power level to obtain an enhanced SNR. A drawback, however, is that two lasers are required, one for recording and one for playback.

Rather than use separate lasers for recording and playback, the present invention provides that the optical properties of the thermal recording material are so altered after recording of a deformation pattern that the same laser used for recording can be used for playback at any selected power level to give a maximum or enhanced SNR without destroying the recorded deformation pattern. Information in the form of a deformation pattern is recorded in the thermal recording material in the normal manner. Then, in accordance with the present invention, the spectral characteristics of the thermal recording material are so altered that it no longer absorbs or, at least, is less absorbant at the wavelength(s) of the recording laser beam. The amount by which the recording material is rendered less absorbant is dependent upon the power level of the read beam (which, preferably, should be high enough to provide readout at the desired SNR) and the $T_g$ of the recording material. In general, the recording material need not be rendered substantially transparent to the wavelength(s) of radiation used for recording; but it should be rendered transparent enough so that upon playback the recording material is not re-melted in such a manner as to affect adversely the recorded deformation pattern. (By not adversely affecting the deformation pattern it is meant that upon playback a useful signal can be obtained. The deformation pattern, therefore, may in some circumstances be physically altered, but its playback capability must remain acceptable.) A decrease in density of the recording material by about 0.3 at the wavelength(s) of radiation used for recording is generally sufficient for some applications. For certain applications wherein it is important to obtain the highest possible SNR (thereby requiring a relatively high power level of the read beam for playback), it is preferable to render the recording material substantially transparent, i.e., an optical density less than about 0.2, to the wavelength of radiation used for playback.

In accordance with a preferred embodiment, the spectral properties of the thermal recording material are altered by bleaching the dye therein to the point where it is relatively transparent, i.e., less absorbant, to radiation at the wavelength(s) of the recording laser beam. The bleaching process can be selected from those known in the art and includes thermal bleaching, photobleaching, and chemical bleaching. The particular bleaching process selected will, in general, depend upon the type of dye in the recording material, the properties of the recording material itself, and the type of recorded deformation pattern.

In thermal bleaching, the application of heat to the thermal recording material causes the spectral properties of the dye to change. While many types of thermal bleaching processes are known in the art and are useful in practicing the invention, two of the more common involve (1) the decomposition of a dye by removal of an acidic component by heat, or (2) the neutralization of the acid component of a dye by a heat generated base. Examples of patents that disclose thermally bleachable dyes are U.S. Pat. No. 3,269,839; U.S. Pat. No. 3,769,019; U.S. Pat. No. 4,081,278 and U.S. Pat. No. Re. 29,168. The selection of a particular thermally bleachable dye will generally depend upon the intended use. For example, it will be apparent to those skilled in the art that the dye should absorb at the wavelength of the recording radiation. Further, the thermally bleachable dye should preferably be selected to be bleachable at a temperature below, or not much higher than, the $T_g$ of the recording material.

As an example of thermal bleaching, a mixture of Iosol Red dye and poly-4,4'-(hexahydro-4,7-methanoindan-5-ylidene)diphenylene terephthalate (1 to 2 by weight) can be diluted in cyclohexanone and spin coated on a support. The amount of dilution, spin speed and duration will be determined by the desired thickness of the coated recording material. A deformation pattern can then be thermally recorded in the recording material using a laser beam. Thereafter, heating the recording material to a temperature of 230° C. for about 30 minutes thermally bleaches the Iosol Red dye but does not degrade the deformation pattern. For example, a coating of such a recording material that initially has an optical density of about 0.8 to blue light can be expected to be bleached to a density of about 0.4 or less. In accordance with the invention, therefore, an argon laser (wavelength of 488 nm) can be used for thermal deformation recording and, after thermal bleaching, for playback as well. Further, since the thermally bleached recording material is relatively transparent at the operating wavelength of the argon laser, the power level for playback can be substantially higher than could be used with unbleached material and the SNR of the recovered information signal is thereby significantly increased.

It is desirable to use a binder that has a high $T_g$ so that the deformation pattern will remain stable during the thermal bleaching process. In addition, use of a high $T_g$ binder allows the use of a higher power read beam for a given absorbance. Dicarboxylic acids, organic diols, and derivatives, e.g., acids, acid chlorides, esters, or anhydrides, which can be incorporated into binder materials (such as polyesters, polyurethanes, polyamides, and mixed polyesteramides) to increase the glass transition temperature and resistance to high temperature include:

(1) The phenylindan dicarboxylates of F. L. Hamb, disclosed in U.S. Pat. No. 3,634,089;

(2) The 1,1'-spirobiindan dicarboxylates of F. L. Hamb and J. C. Wilson, disclosed in U.S. Pat. No. 3,725,070;

(3) The 4,4'-(hexahydro-4,7-methanoindan-5-ylidene) diphenols of M. A. Sandhu, disclosed in Research Disclosure 13568, July, 1975; and (4) The bisphenols of T. L. Conklin and F. L. Hamb, disclosed in Research Disclosure 12012, April, 1974.

Bleaching can also be accomplished by photolysis, i.e., photobleaching. In this case, various sensitizers or accelerators, such as allylthiourea, can be added to the recording material to enhance the bleaching process. In general, during the photobleaching process the dye is reduced or oxidized as a result of absorbing radiation, depending on the particular dye type. For example, methylene blue, which can be sensitized with reducing agents such as thiosinamine, undergo photoreduction and from colorless leuco-forms, whereas polymethine dyes are oxidized to colorless forms. Certain types of dyes (such as SK1 defined below) are readily photobleachable without an added acelerator. Numerous photobleachable dyes are known in the art and are useful in practicing the invention. For example, see U.S. Pat. No. 3,984,248 and Kosar, *Light-Sensitive Systems* published by John Wiley & Sons, Inc. (1965) at 387–401 for a discussion of the photobleaching process and of particular dyes useful therein.

Specific examples of particularly preferred dyes suitable for photobleaching include but are not limited to:

Iosol Red (available from the Allied Chemical Corp.);

a dye having the structural formula

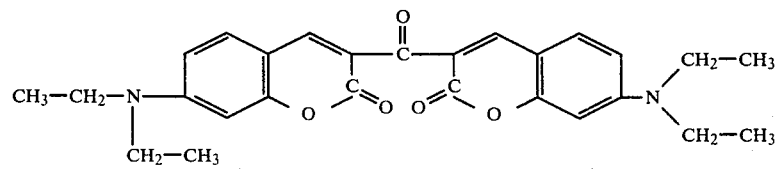

and referred to herein as SK1;

and a dye having the structural formula

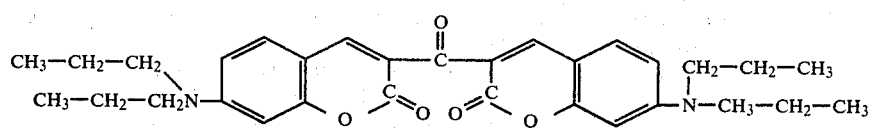

and referred to herein as SK2.

The preparation and utility of coumarin compounds such as SK1 and SK2 are described in Research Disclosure, Publication No. 16167 published September, 1977. These dyes are particularly suited for use with an argon laser recording beam because they are all strongly absorbant at 488 nm. Further, combining these dyes with certain binders to form the recording materials listed in the Table below results in a recording material suitable for high density recording, i.e., individual deformations can be on the order of a micron in size. Still further, these dyes are photobleachable without adversely affecting the recorded deformation pattern.

As a specific example of photobleaching, a recording material comprised of the dye SK1 (defined previously) and cellulose nitrate (1 to 1 by weight) was spin coated on a support after dilution in cyclohexanone. The dilution, spin speed and duration were selected to yield a final coating about 1500 Å in thickness and having an optical density of about 0.8 in blue light. A deformation pattern corresponding to video information was recorded in the medium. To effect bleaching, the recording medium was exposed to a high intensity (50,000 lux or, equivalently, 5,000 ft-candles) daylight source for 24 hours. After exposure, it was found that the dye was bleached to an optical density of less than about 0.5 in blue light. Other dye/binder combinations suitable for photobleaching are given in the following Table:

TABLE

| Ratio of Dye | to | Recording Material Binder (by weight) |
|---|---|---|
| 1 SK1 | | 1 Abitol* |
| 1 SK1 | | 1 poly(ethyl methacrylate) |
| 1 SK1 | | 2 cellulose nitrate |
| 1 SK1 | | 3 cellulose nitrate |
| 1 SK1 | | 4 cellulose nitrate |
| 1 SK1 | | 1 Abitol* and 1 cellulose nitrate |
| 2 SK1 | | 1 Abitol* and 1 cellulose nitrate |
| 1 SK2 | | 1-polystyrene (molecular wt. = 9000) |
| 1 Iosol Red** | | 1 cellulose nitrate |
| 3 Iosol Red** | | 1 cellulose nitrate |

*Abitol is hydroabietyl alcohol and is sold by the Hercules Chemical Co. as Abitol AUK 257.
**Available from the Allied Chemical Corp.

Bleaching can also be accomplished chemically. For example, a dye-containing a reactive carbon-carbon double bond in the chromophoric moiety can be chemically bleached by exposure to bromine vapor. In this case, the selected binder should be permeable by the bromine vapor, or other chemical bleaching agent.

In accordance with a further embodiment of the present invention, a photochromic dye is used to give the recording material the required absorbance at the recording wavelength. A photochromic dye is one which changes color on exposure to radiation. In most cases, the color change is reversible when the radiation exposure terminates. Commonly, photochromic dyes are colorless (transparent) in one state and colored in the other state, but photochromic dyes with two colored forms are known. To understand the selection of a photochromic dye for use in a thermal recording material, consider a video recording of the thermal deformation type wherein the thermal recording material includes a photochromic dye that, in one color state, is absorbant at 488 nm ( the wavelength of the recording beam). In accordance with the invention, the photochromic dye is so selected that, in the other color state, it is relatively transparent at 488 nm (the recording wavelength). In order to read out the recorded information using the same laser as used for recording, the photochromic dye is exposed to (or shielded from) radiation so as to cause the photochromic dye to assume its other color state. Readout can then be performed using the recording laser beam at an increased power level for purposes of improving the SNR, as already discussed. The reversibility of photochromic dyes is a particularly advantageous property when the substance is incorporated into a thermal recording material because the recording medium is reusable. To record new information, it is only necessary to erase the existing deformation pattern by heating the recording material above its $T_g$ and, after cooling, cause the photochromic dye to assume the first color state wherein it is absorbant at the recording wavelength. Such a record device can be repeatedly recorded on and erased.

A large number of photochromic dyes are known, among these being spiropyrans and compounds of mercury, copper, zinc, and metal hexacarbonyls of chromium, molybdenum and tungsten. See, for example, Kosar, *Light-Sensitive Systems* at 380–86 for a more detailed discussion of photochromic substances and their use. Selection of a particular photochromic dye for use in a thermal recording material will depend upon the intended use and the chosen binder.

In still another embodiment of the invention, a dye type commonly referred to as an indicator is used in the thermal recording material. Such dyes have different colors at different hydrogen ion concentrations. Color changes occur because the dyes are acids or bases that undergo proton transfer reactions, and the acid form has a different color than the base form. An example of such a dye is methyl orange which is a yellow negative ion in a pH environment more basic than 4.4. In an environment more acidic than a pH of 3.1 it forms a red dipolar ion. A helium-cadmium laser that produces radiation at a wavelength of 441 nm can be used for recording while the methyl orange is in the yellow color state and, after altering the color state by exposure to an acid, used for playback while the methyl orange is in the red color state. It will be apparent that a binder should be selected that permits the acid solution to be infused therein. It should be noted that even in the red color state, methyl orange absorbs radiation in the 441 nm range. Such absorption is substantially less than when in the yellow color state, however, and thus an increased power level of the laser beam can be used for playback (to give a higher SNR) without re-melting the thermal recording material. A recording material using an indicator dye is reusable in a manner similar to the photochromic recording material discussed above, except that the absorbance is converted back to its original state by changing the hydrogen ion concentration in the dye environment. For a general discussion of indicator dyes, see, for example, Noller, *Chemistry of Organic Compounds*, Second Edition, published by W. B. Saunders Co. (1958) at 699–702.

Still another type of dye system useful in practicing the invention is one that can be washed out of the binder. Washable dyes in general are well known. Insofar as a thermal deformation recording medium is concerned, the washable dye should be selected to be absorbant in the wavelength range of the recording radiation. The binder should be permeable to the solution used to wash the dye from the recording material.

In general, irrespective of the particular method used to alter spectral absorbance, useful dyes are chosen for their respective compatibilities with binders, for high absorptivity at the wavelength of the respective recording beams of choice, and by their ability to be rendered relatively transparent at the wavelength of the recording beam. For example, when the recording beam is produced by an argon laser (wavelength of 488 nm), useful dyes include but are not limited to Iosol Red, SK1 (defined previously) and SK2 (defined previously).

In general, the binder is chosen so that it will disperse or dissolve the chosen dye, and so that it will not interfere with the process which is to be used to alter the spectral absorption characteristics of the dye. While any of the known binders for thermal deformation recording can be used, some illustrative binders include cellulose acetate butyrates, polystyrenes, polysulfonamides, Lexans (polycarbonates), cellulose nitrate, hydroabietyl alcohol (sold by the Hercules Chemical Co. as Abitol AUK 257), poly(ethyl methacrylate) poly(vinyl butyral), and combinations thereof, as well as the high $T_g$ binders previously discussed in connection with the thermal bleaching process.

It will be apparent to those skilled in the art that numerous dye systems are useful in practicing the invention. The above examples are illustrative only and the present invention is not limited thereto but, rather, includes all dye systems that can be incorporated into a binder to form a useful thermal deformation recording material, and wherein the spectral absorption characteristics can be altered to render the dye less dense or substantially transparent to the wavelength of whatever radiation is used for recording. As a practical matter, altering the spectral absorption characteristics of the thermal recording material to render it substantially transparent or at least less absorbant to radiation in the wavelength range between about 300 to 1100 nm is sufficient because the majority of useful laser systems radiate in this range.

The invention has been described in detail with particular reference to certain preferred embodiments thereof, but it will be understood that variations and modifications can be effected within the spirit and scope of the invention.

What is claimed is:

1. In a record device comprising a support having superposed thereon a layer of thermal recording material that contains information recorded in the form of a deformation pattern, said thermal recording material in a first state being absorbant to radiation of a selected wavelength for recording of said deformation pattern by exposure to radiation, the improvement wherein said thermal recording material has been converted to a second state wherein it is significantly less absorbant to said exposing radiation.

2. In a record device comprising a support having superposed thereon a layer of thermal recording material comprised of a dye and a binder, said dye in an unaltered form being absorbant to radiation of a selected wavelength for recording of said deformation pattern by exposure to radiation, and said thermal recording material having information recorded therein in the form of a deformation pattern, the improvement wherein said dye is in a state in which it is significantly less absorbant to said exposure radiation, thereby enabling said record device to be read at an increased power level using radiation from the same source as said exposing radiation.

3. In a record device comprised of a support having superposed thereon a layer of thermal recording material, the thermal recording material having information recorded therein in the form of a deformation pattern by exposure to radiation, the improvement wherein:

the spectral characteristics of the thermal recording material have been altered so that the thermal recording material is relatively transparent to radiation at the wavelength or wavelengths of said exposing radiation.

4. In a record device comprised of a support having superposed thereon a layer of thermal recording material that includes a dye, and wherein a deformation pattern has been recorded in the thermal recording material by exposure to radiation, the improvement wherein the dye has been bleached to render it relatively transparent to the wavelength or wavelengths of said exposing radiation without adversely affecting said deformation pattern.

5. A record device as claimed in claim 4 wherein said dye is selected from the group consisting of Iosol Red, SK1 and SK2.

6. In a record device comprised of a support having superposed thereon a layer of thermal recording material that includes a thermally bleachable dye, and wherein a deformation pattern has been recorded in the thermal recording material by exposure to radiation, the improvement wherein the dye has been thermally bleached to render it relatively transparent to the wavelength or wavelengths of said exposing radiation without adversely affecting said deformation pattern.

7. A record device as claimed in claim 6 wherein said dye is Iosol Red.

8. In a record device comprised of a support having superposed thereon a layer of thermal recording material that includes a photobleachable dye, and wherein a deformation pattern has been recorded in the thermal recording material by exposure to radiation, the improvement wherein the dye has been photobleached to render it relatively transparent to the wavelength or wavelengths of said exposing radiation without adversely affecting said deformation pattern.

9. A record device as claimed in claim 8 wherein said dye is selected from the group consisting of Iosol Red, SK1 and SK2.

10. A record device as claimed in claim 8 wherein said thermal recording material is comprised of a mixture of SK1 dye and cellulose nitrate in a ratio between about 1:1 and about 1:4 by weight.

11. A record device comprising a layer of thermal recording material that includes a photochromic dye transformable between a first color state absorbant to recording radiation of a given wavelength and a second color state significantly less absorbant to said recording radiation.

12. In a video record device comprised of a layer of thermal recording material having video information recorded in the form of discrete, micron-sized deformations by a recording laser beam, the improvement wherein:

the thermal recording material has been rendered relatively transparent to radiation of the wavelength of the recording laser beam, thereby enabling the recording laser beam to be used for playback at a power level that enhances the signal-to-noise ratio of the recovered information signal.

13. A method of altering the spectral absorption characteristics of a layer of thermal recording material comprised of a dye and a binder, said thermal recording material having information recorded therein in the form of a deformation pattern by exposure to radiation, said method comprising the step of bleaching the dye to render it relatively transparent to said exposing radiation without adversely affecting said deformation pattern.

14. A method as claimed in claim 13 wherein said dye is bleached by a thermal bleaching process.

15. A method as claimed in claim 13 wherein said dye is bleached by a photobleaching process.

16. A method as claimed in claim 13 wherein said dye is bleached by a chemical bleaching process.

17. A method of playing back information recorded in the form of deformations in a layer of thermal recording material, which recording material in a first condition is absorbant to recording laser radiation of a selected wavelength, and which recording material in a second condition is significantly less absorbant to said recording radiation, said method comprising the steps of:

a. altering said thermal recording material from said first condition to said second condition to render it less absorbant to said recording radiation, and
b. illuminating said recorded deformations with radiation from said recording laser to develop a signal indicative of the recorded information without adversely affecting said recorded deformations.

18. A method as claimed in claim 17 further comprising the step of adjusting the power level of said illuminating radiation to maximize the signal-to-noise ratio of the recovered signal.

19. A method of playing back information recorded in the form of a deformation pattern in a layer of thermal recording material, which recording material includes a dye alterable by bleaching from a first state to a second state, in said first state said dye being absorbant to radiation of a selected wavelength for recording said deformations by exposure to a laser beam, and in said second state said dye being significantly less absorbant to said recording radiation, said method comprising the steps of:

a. bleaching said dye to alter it from said first state to said second state, thereby rendering it less absorbant to said recording radiation, and
b. illuminating said recorded deformation pattern with radiation from said recording laser to develop a signal indicative of the recording information without adversely affecting said recorded deformation pattern.

20. A method as claimed in claim 19 further comprising the step of adjusting the power level of said illuminating radiation to maximize the signal-to-noise ratio of the recovered signal.

21. A method as claimed in claim 19 wherein said dye is bleached by a thermal bleaching process.

22. A method as claimed in claim 19 wherein said dye is bleached by a photobleaching process.

23. A method as claimed in claim 19 wherein said dye is bleached by a chemical bleaching process.

24. In a method of preparing a thermal deformation record device comprising the steps of forming a layer of thermal recording material on a support, and recorded a deformation pattern in said thermal recording material by exposure to radiation, said thermal recording material in a first form being absorbant to radiation of a selected wavelength for recording of said deformation pattern, the improvement comprising the steps of:

altering the spectral absorption characteristics of said thermal recording material to render it significantly less absorbant to radiation of the wavelength or wavelengths of said exposing radiation.

25. In an improved method as claimed in claim 24 wherein said thermal recording material includes a dye that, in an unaltered form, is absorbant to said exposing radiation, the improvement wherein said dye is altered by bleaching to a form significantly less absorbant to radiation of the wavelength or wavelengths of said exposing radiation.

26. A method as claimed in claim 25 wherein said dye is bleached by a photobleaching process.

27. A method as claimed in claim 25 wherein said dye is bleached by a thermal bleaching process.

28. A method as claimed in claim 25 wherein said dye is bleached by a chemical bleaching process.

29. A method of recording and playing back information in the form of deformations in a layer of thermal recording material, which recording material in a first condition is absorbant to radiation of a predetermined wavelength range, and which recording material in a second condition is less absorbant to radiation within said wavelength range, said method comprising the steps of:

a. recording information in the form of thermal deformations in said thermal recording material by selectively exposing said material to laser radiation having a wavelength with said wavelength range;
b. altering said thermal recording material from said first condition to said second condition to render it less absorbant to said recording radiation, and
c. illuminating said recorded deformations with radiation from said recording laser to develop a signal indicative of the recorded information without adversely affecting said recorded deformations.

30. A method as claimed in claim 29 further comprising the step of adjusting the power level of said illuminating radiation to maximize the signal-to-noise ratio of the recovered signal.

31. A method of recording and playing back information, said method comprising:

a. recording information in the form of discrete, light-scattering craters in a recording layer comprising a bleachable dye dispersed throughout a substantially-transparent, heat-deformable binder by selectively exposing said recording layer to a beam of laser radiation of a predetermined power and of a predetermined wavelength to which said dye is highly absorptive;
b. bleaching said dye to render it substantially less absorptive to said predetermined wavelength; and c. scanning the light-scattering radiation with a beam of laser radiation of said predetermined wavelength.

32. A high information density record device comprising a support having a light reflective surface and a recording layer overlying said surface, said recording layer comprising a dye-binder mixture wherein the dye has been bleached from a state of relatively high absorption to radiation of a predetermined wavelength to a state of relative transparency to radiation of said predetermined wavelength and having therein a plurality of discrete light-scattering craters formed by selective exposure of said layer to light of said predetermined wavelength.

* * * * *

UNITED STATES PATENT AND TRADEMARK OFFICE
CERTIFICATE OF CORRECTION

PATENT NO. : 4,270,130
DATED : May 26, 1981
INVENTOR(S) : Conrad G. Houle et al

It is certified that error appears in the above-identified patent and that said Letters Patent are hereby corrected as shown below:

Column 12, line 11, "recorded" should read -- recording-- and line 16, "steps" should read --step--.

Signed and Sealed this

Eighteenth Day of August 1981

[SEAL]

Attest:

Attesting Officer

GERALD J. MOSSINGHOFF

Commissioner of Patents and Trademarks